July 17, 1934.  P. M. MILLER  1,966,826
VEHICLE ARTILLERY WHEEL
Filed April 29, 1930
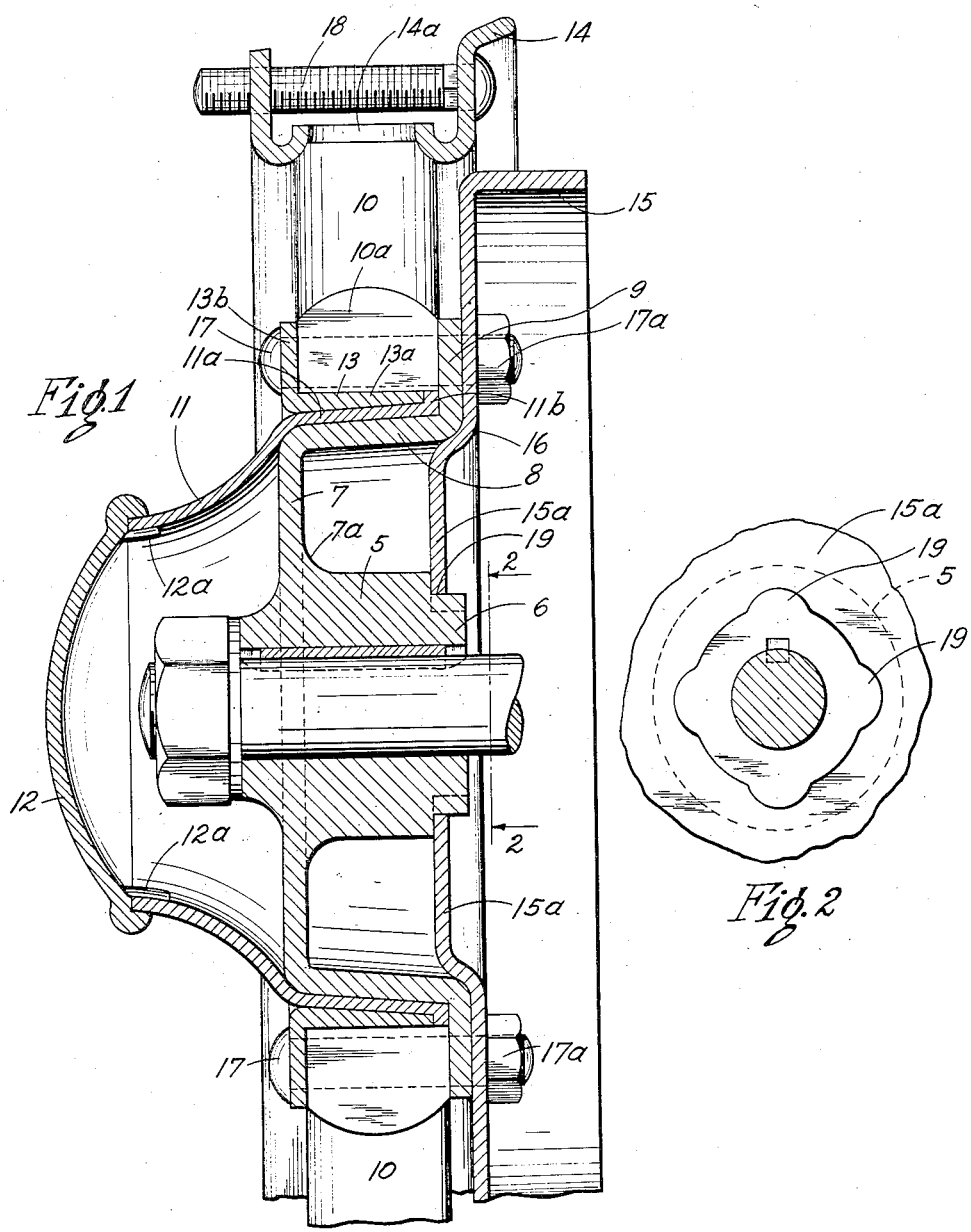
Inventor
PHILIP M. MILLER
Richey & Watts
Attorneys Patented July 17, 1934

1,966,826

UNITED STATES PATENT OFFICE 1,966,826

VEHICLE ARTILLERY WHEEL

Philip M. Miller, Youngstown, Ohio, assignor to Miller Devices Inc., New York, N. Y., a corporation of New York Application April 29, 1930, Serial No. 448,345

4 Claims. (Cl. 301—5)

This invention relates to wheels for motor vehicles, and the primary object of the same is to provide an artillery type wheel which, in the main, is formed of metal parts, the nave of the wheel being so constructed as to provide a hollow central portion which occupies a considerable area of the wheel diameter so that relatively short spokes may be used while at the same time the wheel is strong and sufficiently light as to adapt it for both light and heavy duty vehicles.

More specifically, the invention contemplates an artillery type wheel for motor vehicles having a hub barrel provided with a cup-shaped wheel-supporting member which occupies a relatively great area of the wheel diameter, the said member being adapted to support a spider embodying a plurality of relatively short spokes, the entire wheel assembly being economic to manufacture, and due to the particular construction of the nave portion, the wheel as a whole is rendered light, yet strong and durable and embodies symmetrical lines and beauty of design.

The foregoing and other objects and advantages will become apparent from the following description when taken in conjunction with the drawing wherein:

Figure 1 is a substantially central transverse sectional view of a wheel embodying the features of the present invention; and, Fig. 2 is a fragmentary view in elevation of the central or hub portion of the wheel as viewed from the inboard side thereof, showing the method of keying the web of the brake drum to the hub.

Referring to the drawing in detail, 5 designates a hub barrel which at its inboard extremity is formed with an annularly reduced portion 6 to which the web of the brake drum is keyed in a manner to be described. At its outer extremity, the hub barrel is provided with a substantially disc shaped wall 7 which is extended radially and then turned and extended transversely to provide a wheel-supporting wall 8, the latter terminating in a substantially radial attaching flange 9.

The hub barrel 5 and hub wall 7 together with the transverse wall 8 and flange 9 may be formed as an integral forging or casting, and at the point where the wall 7 merges with the hub barrel, a reinforcing fillet 7a is preferably provided to strengthen the structure. The hub wall 7 is preferably extended radially such distance as will provide a central nave area whose diameter is relatively great with respect to the over-all diameter of the wheel, thereby requiring spokes which are relatively short in length and reducing the weight of the wheel as a whole.

The spokes of the wheel are indicated at 10 and said spokes may be formed of wood or metal. As shown, these spokes are formed of metal and are each provided with side faces 10a which abut one another when arranged in radial assembled relation.

The transverse wall or ledge 8 is preferably slightly inclined transversely of the wheel, and on this wall or ledge a shell member 11 having a peripheral flange 11a is mounted, the flange 11a terminating in a locking flange 11b. The outboard extremity of the shell 11 is preferably of arched contour and is adapted to receive a cap or cover 12, the said cap being frictionally engaged with the end of the shell 11 through the medium of a plurality of prongs 12a which may be welded to or otherwise secured or formed integrally with the said cap.

Telescoped over the part 11a of the shell 11 is a transversely split locking ring generally indicated at 13, said ring being formed with a base flange 13a of tapered contour and a side or clamping flange 13b. A rim or felly member 14 is provided and the ends of the spokes are projected into openings 14a formed in said rim, the base portions of the spokes being seated on the wedge shaped base flange 13a of the ring 13. When the ring 13 is drawn towards the attaching flange 9, the said wedge shaped base flange 13b exerts radial pressure on the spokes and projects the latter slightly outwardly to place the parts under tension.

To reinforce the structure, a brake drum generally indicated at 15 is attached to the inboard side of the wheel and is provided with a web 15a which is offset at an intermediate point to provide an annular shoulder 16 which is fitted into the cup defined by the transverse wall 8.

Bolts 17 are passed through the side flange 13b of the ring 13 and between the spokes 10 and through the attaching flange 9 and web 15a of the drum 15, and nuts 17a are applied to the bolts to draw the parts together in assembled relation.

The rim 14 may be a tire rim or may be a felly band. As shown, the said rim constitutes a felly member adapted to receive a tire rim, rim-locking bolts 18 being projected through the side walls of the said felly member for locking a tire rim and tire thereon, as will be readily understood.

The preferred method of keying the web 15 of the drum to the hub barrel is shown in Fig. 110

2. The central portion of the web 15a is snugly engaged over the reduced portion of the hub barrel 5 and the latter is formed with a plurality of bosses or keys 19 which engage in keyways formed in the said web 15a.

The manner of assembling the wheel will be readily understood. The nave shell 11 may be telescoped over the transverse wall 8 of the nave member and the spokes, locking ring and rim or felly member may be assembled as a separate unit and positioned on the flange 11a of the shell 11. The brake drum may then be fitted into the inboard side of the nave portion of the wheel, and the bolts 17 applied and tightened, thereby drawing the parts into locked position and simultaneously projecting the spokes 10 radially outwardly just sufficiently to place the spokes under tension without materially separating the latter at their base portions. When the parts are assembled, it will be noted that the web of the brake drum braces the inboard side of the wheel, while at both the outboard and inboard sides the load is transmitted in straight line to the hub barrel through the radial disc like wall 7 and web wall 15a. The hollow nave portion, while appearing to be tightly closed, serves to ventilate the interior of the wheel, since I have found that a metal to metal fit permits sufficient air to circulate in the central portion of the wheel while the latter is in service on the road to carry off or dissipate heat generated through the braking action and friction. When viewed from the outboard side, the wheel presents a symmetrical and attractive appearance due to the contour of the nave in conjunction with the relatively short artillery type spokes.

It will be understood that certain modifications and variations in structure may be adopted within the scope of the invention as defined by the appended claims.

I claim:

1. A wheel for motor vehicles, comprising a hub formed with a disk-like wall which is extended radially at substantially right-angles therefrom, said wall being offset at its periphery and extending at an incline transversely of the wheel, to form a support for the wheel spokes, and then merging into a radial flange, a drum member seated against said radial flange and formed with an annular shoulder which seats in the offset portion of the hub wall, a hub shell having a transversely flared periphery with an edge which fits on said transverse offset, an angle-shaped spoke-supporting ring fitting on the said transversely flared periphery and engaging with the edge of said shell, and a spider member formed with relatively short spokes fitting on the bottom wall of said ring and clamped between the side wall thereof and said radial flange, and means adapted to complete the exterior of the wheel.

2. A wheel for motor vehicles, comprising a hub formed with a disk-like wall which is extended radially therefrom, said wall being transversely offset at its periphery to form a support for the wheel spokes, a hub shell having a peripheral wall fitting on said offset, said shell wall terminating in a locking flange, an angle-shaped ring fitted on said shell wall against said flange and locking the shell in place, and a spider member formed with relatively short spokes held in position by said ring.

3. A wheel for motor vehicles, comprising a hub formed with a disk-like wall which is extended radially therefrom, said wall being transversely inwardly offset at an incline and terminating in a radial flange, a drum member secured to said radial flange and formed with an annular shoulder seated in the offset portion of said hub wall, a hub shell having a flaring edge fitted on said offset, a series of relatively short spokes also mounted on said offset, a tire rim carrying member in engagement with the outer ends of the spokes; and an angle-shaped ring secured to and adapted to hold said spokes in locking engagement with said rim carrying member and also secured to said radial flange and drum and locking the shell in place.

4. A wheel assembly comprising a hub disk which is centrally enlarged and extended transversely to provide a bearing housing, said disk being transversely offset at its periphery and then terminating in a radial flange, a drum member formed with an annular shoulder which seats in the offset portion of said disk and has a driving connection with said bearing housing, a hub shell formed with a peripheral flange, said shell being fitted over said offset portion of said disk, a locking ring having a side wall and a wedge-shaped bearing flange which fits over said shell and wedges it in place, a spider member provided with relatively short spokes positioned between the side wall of said ring and said radial flange of the hub disk, and means for securing the ring, spider, shell hub disk and drum in assembled position.

PHILIP M. MILLER.